United States Patent [19]

Burton et al.

[11] 4,041,272

[45] Aug. 9, 1977

[54] RESISTANCE WELDING APPARATUS AFFORDING OPERATOR PROTECTION

[75] Inventors: Peter Edward Burton, Wallingford; Derek James Pasquire, Witney; Peter Edward George Marshall, Haddenham, all of England

[73] Assignee: British Leyland UK Limited, London, England

[21] Appl. No.: 617,085

[22] Filed: Sept. 26, 1975

[51] Int. Cl.² ............................................. B23K 11/24
[52] U.S. Cl. ....................................... 219/89; 219/108
[58] Field of Search ...................... 219/86, 89, 108, 78

[56] References Cited

U.S. PATENT DOCUMENTS

| | | | |
|---|---|---|---|
| 2,400,486 | 5/1946 | Carlyle | 219/78 |
| 2,494,847 | 1/1950 | Welch | 219/86 |
| 2,573,125 | 10/1951 | Welch | 219/108 |
| 2,650,977 | 9/1953 | Welch | 219/86 |
| 2,967,227 | 1/1961 | Mierendorf et al. | 219/108 |
| 2,970,205 | 1/1961 | Rockafellow | 219/108 |
| 2,996,603 | 8/1961 | Stolz et al. | 219/89 |
| 3,129,320 | 4/1964 | Capaldo et al. | 219/89 |

Primary Examiner—J. V. Truhe
Assistant Examiner—Clifford C. Shaw
Attorney, Agent, or Firm—Brisebois & Kruger

[57] ABSTRACT

Resistance welding apparatus having a power driven welding head carrying a first welding electrode for co-operation with a second welding electrode, wherein the head is switched from a low-force approach operating mode to a high-force squeeze operating mode only when the welding electrodes electrically contact one another, either directly or through a workpiece therebetween, so that no gap exists in which an operator's hand or finger can be crushed between the electrodes upon transition from low-force to high-force operation.

5 Claims, 3 Drawing Figures

RESISTANCE WELDING APPARATUS AFFORDING OPERATOR PROTECTION

BACKGROUND OF THE INVENTION

This invention relates to resistance welding apparatus which affords protection to an operator who inadvertently exposes any part of his hand to the risk of crushing between the welding electrodes of the apparatus.

It is a fundamental requirement of resistance welding apparatus that the welding electrodes be applied to a workpiece under load. Generally, the load required for a satisfactory weld is in the range of a few hundred pounds to several tons per square inch; such high loads will instantly crush a finger or thumb.

In an earlier construction of resistance welding apparatus affording operator protection, a power actuated welding electrode makes a low-force approach to within a quarter of an inch from a workpiece before it is switched to a high-force operating mode. If the electrode meets an obstruction such as a finger during its low-force approach, then it is quite simply halted by that obstruction and no serious injury results. In the earlier apparatus, the moment at which the power actuated electrode is switched to its high-force operating mode is determined by the position of a switch that is actuated by a piston driving the electrode towards the workpiece. Since the welding electrodes tend to become shortened by wear and re-dressing in service, a condition can arise in which the power actuated electrode is more than a finger thickness from the workpiece at the moment it is switched to its high-force operating mode. To make the apparatus safe again the operator must either adjust the position of the mode switch, or replace the electrodes with new ones; this gives rise to problems of safety maintenance.

SUMMARY OF THE INVENTION

The present invention is aimed at avoiding the aforesaid risk of an operator's hand or finger being crushed between the welding electrodes, and is further aimed at reducing the frequency of replacement of the electrodes that is necessary in the earlier apparatus for maintaining a safe condition. A more particular aim of the invention is to ensure that no gap at all between the power actuated electrode and the workpiece is present for entrapment of any part of the operator's hand at the moment of switching to the high-force operating mode. To these ends, resistance welding apparatus according to the present invention features: a power driven welding head adapted to be switched between low-force and high-force operating modes; means for inducing a low voltage in the secondary winding of the welding transformer; and control means responsive to a short circuit of the low voltage through the welding electrodes for switching the welding head from its low-force to its high-force operating mode.

DETAILED DESCRIPTION OF THE PREFERRED EMBODIMENT

Figure 1:
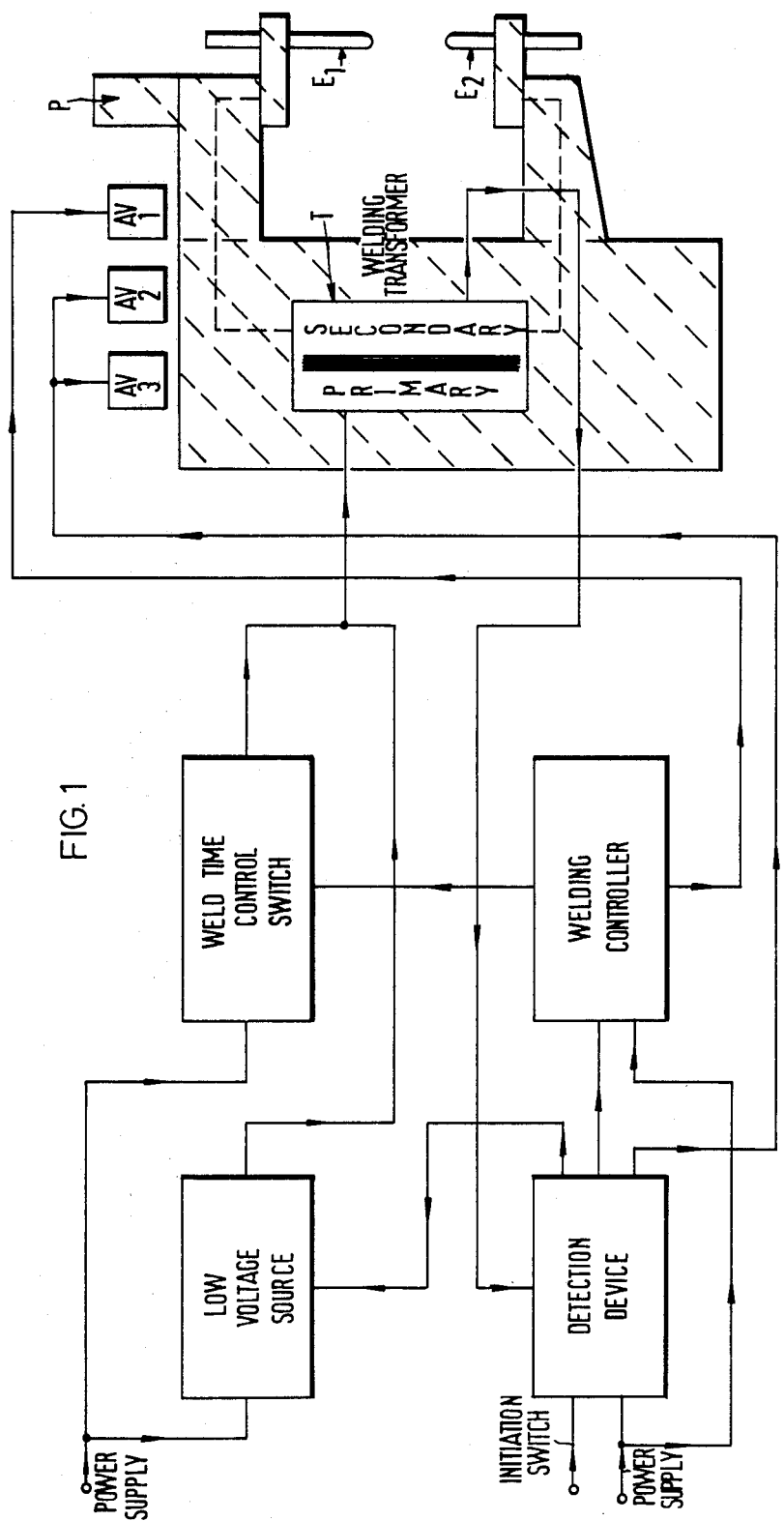
FIG. 1 is a schematic illustration of a preferred resistance welding apparatus according to the invention, showing the electrical features thereof in block diagram.

As shown in FIG. 1, the preferred resistance welding apparatus has two welding electrodes E1 and E2 connected, as indicated by dash lines, to the secondary winding of a welding transformer T. The electrode E1 is mounted to be driven by means of a pneumatic piston actuator P (see also FIG. 2) towards the other electrode E2, so as to close on a workpiece (not shown) therebetween. The operation of the actuator P is controlled through three solenoid operated air valves AV1, AV2 and AV3 and will now be described with particular reference to FIG. 2.

Figure 2:
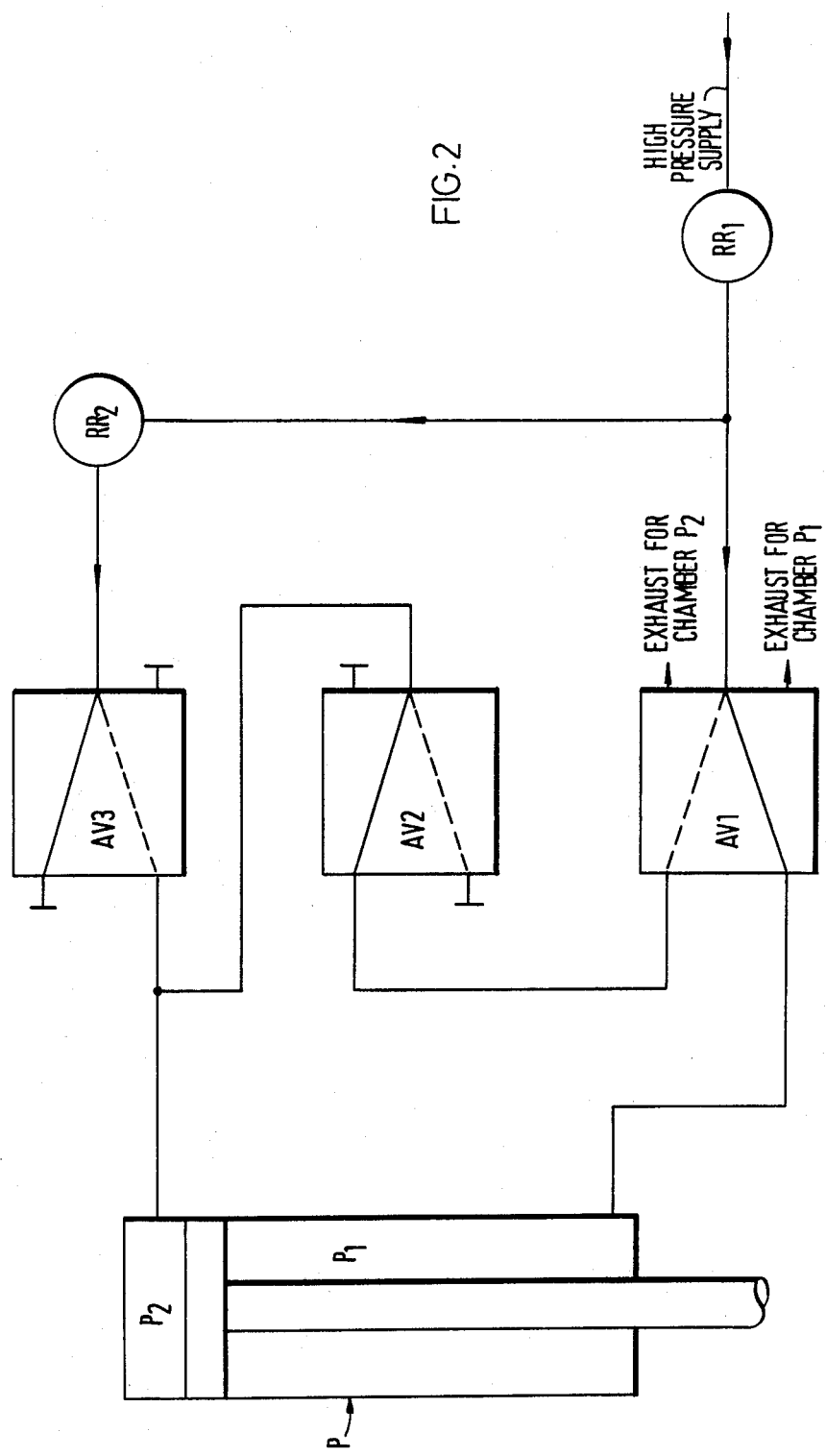
FIG. 2 is a schematic diagram of the pneumatic features of the apparatus.

In FIG. 2 each of the valves AV1, AV2 and AV3 is shown de-energised, the solid lines in the boxes representing the pneumatic connections made by these valves in this condition. The dash lines in the boxes represent the alternative connections made by the valve when energised.

In the condition illustrated, the piston and its associated electrode E1 (FIG. 1) are held fully retracted. Compressed air from a single source is supplied through a pressure regulator RR1 and the valve AV1 to the chamber P1 at one side only of the piston. The chamber P2 at the opposite side of the piston is open to atmosphere through valve AV2 and an exhaust outlet of the valve AV1. Should there be a compressed air supply failure, the piston and its associated electrode, if vertically disposed, will simply descend under their own weight at a rate checked or retarded by the air trapped in chamber P1 being relieved through the pressure regulator RR1 to atmosphere. Thus, an operator is safeguarded against injury in the event of a failure in the supply of compressed air to the apparatus.

To obtain a low delivery of the electrode E1 towards the electrode E2 (FIG. 1), the two valves AV2 and AV3 are simultaneously energised so that they make the alternative connections represented in dash lines in FIG. 2. The blind connection made by valve AV2 effectively shuts it, whilst the valve AV3 connects the compressed air supply to the chamber P2. Since the piston has a greater effective area in chamber P2 than in chamber P1, it is forced to descend. A second pressure regulator RR2, between the first pressure regulator RR1 and the valve AV3, limits the pressure in the chamber P2 so that it is only just effective to overcome the effect of the pressure maintained in the chamber P1, whereby the force of the descent is limited to a safe level e.g. 30 to 40 lbf. Thus, the electrode E1 makes a controlled low-force approach to the workpiece without risk of serious injury to the operator.

To obtain a high force application of the electrode E1 to the workpiece, the valve AV1 is energised, shortly followed by de-energisation of the valves AV2 and AV3. Air exhausts from the chamber P1 via the valve A1 to atmosphere, and compressed air is supplied at full pressure through the valve AV1 (now making the connection represented in dash-line in FIG. 2) and thence through the valve AV2 (as shown) to the chamber P2. It will be noted that the pressure regulator RR2 is by-passed. Thus the electrode E1 is applied at high-force to the workpiece, under the full pressure of the compressed air supply in chamber P2.

Figure 3:
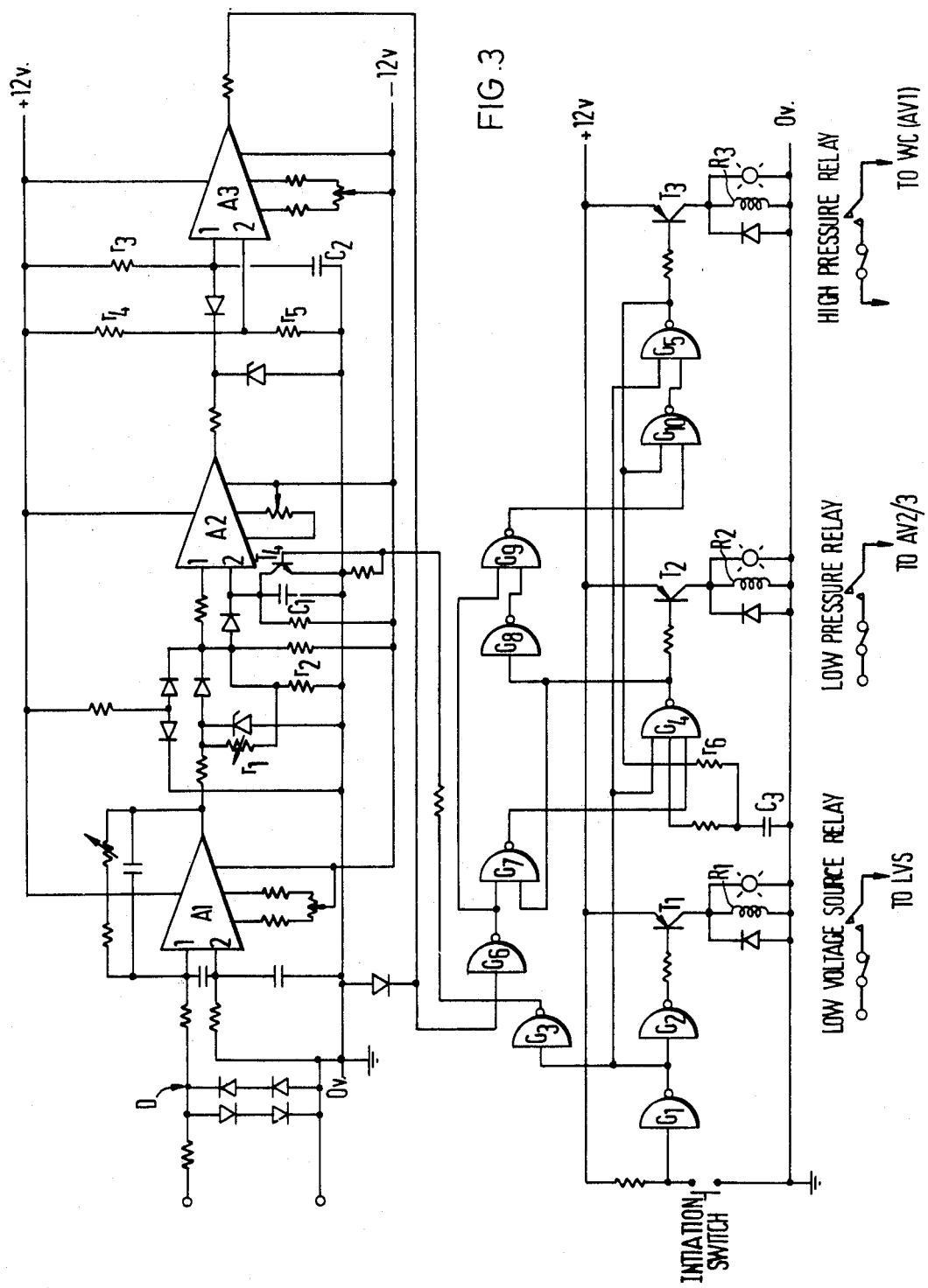
FIG. 3 is a circuit diagram of the Detection Device, identified as such in FIG. 1.

The electrical features of the apparatus, by which the sequence of operation of the valves AV1, AV2 and AV3 is established and controlled, will now be described with particular reference to FIGS. 1 and 3.

The detection and logic is performed in an electronic Detection Device (DD) and the welding sequence is initiated by a switch in this device. When the Initiation Switch (FIG. 3) is closed by the operator, the DD produces a first output that switches on a Low Voltage Source (LVS). The LVS is connected to the primary winding of the welding transformer T so that a low voltage is induced in the secondary winding. The induced low voltage is fed back to the DD which responds by producing a second output that results in energisation of the valves AV2 and AV3. The electrode E1 then commences its low force approach to the workpiece as previously described with reference to FIG. 2.

If the electrode meets a substantially non-conducting obstruction, such as a finger or thumb of the operator, it is simply halted in its approach by that obstruction. If, however, there is no obstruction, then the electrode E1 eventually makes electrical contact with the electrode E2 through the workpiece so that, in effect the ends of the secondary winding of transformer T are coupled in a closed loop. This results in a change in the signal voltage to the DD which responds by (i) producing a third output that initiates the operation of a Welding Controller (WC) and (ii) after a short delay, removes the output from the valves AV2 and AV3. During the delay, the WC operates to energise the third valve AV1, so that upon the de-energisation of valves AV2 and AV3, the electrode E1 is applied under full force to the workpiece, as previously described with reference to FIG. 2. The WC also operates in response to the third output of the DD to close a Weld-time Control Switch (WCS), whereby the welding current from a 400 V power supply is applied to the primary winding of transformer T.

The welding sequence proceeds and will cycle for as long as the operator holds the initiation switch in the DD closed. When this switch is opened the valve AV1 is de-energised so that the electrode is fully retracted, as previously described with reference to FIG. 2. If, however, the initiation switch is held closed, the electrode E1 has time only for partial retraction between welding cycles, since valves AV2 and AV3 are energised to commence the new cycle before all the air has exhausted from chamber P2. This is to say, the air remaining trapped in chamber P2 is compressed by the supply pressure in chamber P1 until it equalises that pressure, and so prevents full retraction of the piston.

The Detection Device and its control logic will now be more particularly described with reference to FIG. 3. As shown, the circuit includes a relay R1 for switching the LVS; a relay R2 for energising the valves AV2 and AV3; and a relay R3 for switching the WC (see FIG. 1) and thus, indirectly energising valve AV1.

The signal voltage induced in the secondary winding of the welding transformer T, is fed via the diode network D to the input of a first amplifier A1. The diode network D limits the input to a safe level when the full welding voltage is induced in the secondary winding. The signal voltage, of 0.1 - 0.3 volts, is amplified by amplifier A1 to a manageable level of, say, 2-6 volts.

When the welding electrodes are in the normally open position, a low voltage exists across them. Its magnitude depends on the electrical characteristics of the particular apparatus, together with other factors such as mains voltage level. Amplifier A2 is connected as a "Comparator," to detect the drop in this voltage as the electrodes make contact through the workpiece.

The signal voltage is fed by amplifier A1 onto the inverting input ($1/p1$) of Amplifier A2. A percentage of this voltage, determined by the ratio $r2/(r1 + r2)$ is fed to the non-inverting input ($1/p2$), and is stored by capacitor C1. Each positive half cycle of the amplified signal voltage therefore normally exceeds the stored voltage across capacitor C1 and causes the output of Amplifier A2 to switch to the low state. Thus, when the electrodes are in the open position, a continuous train of square pulses is emitted from the output of amplifier A2, in sequence with positive half cycles of the amplified signal voltage.

As the electrodes make contact through the workpiece, the amplified signal voltage collapses to a valve below that stored across capacitor C1, and the train of output pulses ceases.

Amplifier A3 is connected as a "Missing Pulse Detector." Capacitor C2 is reset to earth potential with negative pulse output from amplifier A2. When the pulses cease capacitor C2 will charge positively through resistor r3 until its voltage exceeds the level determined by the ratio $r5/(r4 + r5)$. Then the output of Amplifier A3 switches to the low state and indicates that the electrodes have made contact.

The control logic of the detection device is summarised as follows:

I Initiate Button open-circuit (Not Depressed)

a. Gate G1 ON; Gate G2 OFF; Transistor T1 OFF. LVS relay R1 is de-energised and no 'low voltage' is applied by the LVS.
b. Gate G1 ON; Gate G4 OFF; Transistor T2 OFF. AV2/3 relay R2 is de-energised and, accordingly, both valves AV2 and AV3 are de-energised.
c. Gate G1 ON; Gate G5 OFF; Transistor T3 OFF. WC relay R3 is de-energised and, accordingly, the weld controller operation is inhibited and valve AV1 is de-energised.
d. Gate G1 ON; Gate G3 OFF; Transistor T4 ON. This ensures that the memory capacitor C1 is reset to zero.

II On initiation — before electrode contact a) Gate G1 OFF; Gate G2 ON; Transistor T1 ON. LVS relay R1 is energised and the low voltage is applied to the weld transformer.
b) Gate G1 OFF; Gate G3 On; Transistor T4 OFF. Clamping of memory capacitor C1 is released.
c) Gate G1 OFF. Providing that electrodes are detected to be 'open' (i.e. Gate G6 ON and Gate G7 OFF) and the high pressure is not initiated (i.e. Gate G5 OFF), then Gate G4 switches ON, Transistor T2 ON and the valves AV2 and AV3 are energised for low-force approach.
d. Whilst the electrodes are open: Gate G6 ON; Gate G9 OFF; Gate G10 ON; and Gate G5 OFF. Therefore the high pressure valve AV1 remains uninitiated.

III On initiation — after electrode contact a. Output of Amplifier A3 switches to the low state.
b. Gate G6 OFF; Gate G9 ON (providing that valves AV2 and AV3 energised, i.e. Gate G8 OFF); Gate G10 OFF; Gate G5 ON; Transistor T3 ON. The WC relay R3 is energised, thus initiating the WCS and energising valve AV1.
c. Gate G5 ON; Gate G4 OFF. Activation of the high pressure control gate G5 inhibits the low pressure control gate G4. Thus the low pressure valves AV2 and AV3 are de-energised and the WCS remains initiated, until the initiation button is released.

d. The G5 - G10 feedback loop ensures:
  i. That the high pressure control is not removed, during the weld time, when a large secondary circuit voltage causes Amplifier A2 to falsely detect the 'electrode open' situation.
  ii. That the high pressure control remains after the low pressure control has been terminated.

e. By introducing a time delay (r6 C3) in the signal path G5 - G4, and incorporating feedback from G4 - G7 it is possible to delay the termination of the low pressure control until any desired period after the initiation of the high pressure control. This may be necessary in some forms of the pneumatic circuit.

What we claim is:

1. Resistance welding apparatus comprising:
first and second welding electrodes,
a power-operated welding head operatively connected to said first electrode to move said first electrode from a first position remote from said second electrode to a second position in electrical contact therewith, and adapted to operate in either a low-force non-welding or a high-force welding mode,
a welding transformer having a secondary winding short-circuited across the welding electrodes when said electrodes are in electrical contact, and
electrically actuated operator protection means comprising:
  a. means for inducing a low voltage in said secondary winding, and
  b. control means responsive to the change in the induced low voltage which results from a short circuit of said secondary winding through the welding electrode and connected to switch the welding head from its non-welding low-force to its high-force welding mode when a short-circuit occurs.

2. Apparatus according to claim 1, in which the control means includes a detector circuit connected to the secondary winding of the welding transformer for signaling a change in the low voltage resulting from said short circuit, and a logic circuit connected to the detector circuit so as to be responsive to the induction of the low voltage for initiating the low-force operation of the welding head, and to the low-voltage change signal from the detector circuit for initiating the high-force operation of the welding head.

3. Apparatus according to claim 2, in which the logic circuit includes a weld cycle initiation switch, a first relay for activating the low voltage means, a second relay for activating the welding head to effect low-force advance of the first electrode towards the second electrode, and a third relay for activating the welding head to effect high-force application of the first electrode to a workpiece, the weld cycle initiation switch being connected to energize the first relay as a precondition for energization of the second and third relays.

4. Apparatus according to claim 1, in which the welding head is pneumatically operated and includes: an electrode actuating piston having a larger effective area on an advance side for advancing the first electrode than on an opposite retract side for retracting the first electrode; a first solenoid operated valve (AV1) normally open to deliver high pressure to the retract side of the piston and to vent the advance side of the piston to atmosphere, but energizable to instead deliver the high pressure to the advance side and to vent the retract side to atmosphere; a second solenoid operated valve (AV2) normally open in series with the first valve either for the venting of or for the delivery of high pressure to the advance side of the piston, and energizable to shut and thereby prevent communication between the first valve and the "advance" side of the piston; and a third solenoid operated valve (AV3), normally shut, and energizable simultaneously with the energization of the second valve, to deliver high pressure directly to the "advance" side of the piston; the arrangement being such that the welding head operates in its low-force mode when either none of the valves, or only the second and third valves are energized, and in its high-force mode when only the first valve is energized.

5. Apparatus according to claim 4, in which a first high pressure supply regulator is connected to an inlet of the first valve, and a second high pressure supply regulator is connected between the first regulator and an inlet of the third valve for reducing the high pressure delivered, by the third valve to the advance side of the piston.

* * * * *

UNITED STATES PATENT OFFICE
CERTIFICATE OF CORRECTION

PATENT NO. : 4,041,272
DATED : August 9, 1977
INVENTOR(S) : Peter Edward Burton; Derek James Pasquire; Edward George Marshall It is certified that error appears in the above—identified patent and that said Letters Patent are hereby corrected as shown below:

[30]      Foreign Application Priority Data

Sept. 26, 1974      Great Britain...........41988/74

Signed and Sealed this

*Twenty-seventh* Day of *December 1977*

[SEAL]

Attest:

RUTH C. MASON        LUTRELLE F. PARKER
*Attesting Officer*        *Acting Commissioner of Patents and Trademarks*